United States Patent [19]

Sukigara et al.

[11] Patent Number: 5,299,074
[45] Date of Patent: Mar. 29, 1994

[54] SYSTEM FOR POSITIONING A HEAD IN A TRANSVERSE REFERENCE POSITION ON A MULTITRACK DIGITAL MAGNETIC TAPE

[75] Inventors: Motoyuki Sukigara, Tokyo; Yoshiaki Sakai, Higashikurume, both of Japan

[73] Assignee: Teac Corporation, Tokyo, Japan

[21] Appl. No.: 738,223

[22] Filed: Jul. 30, 1991

[30] Foreign Application Priority Data

Jul. 31, 1990 [JP] Japan ................... 2-203341

[51] Int. Cl.$^5$ .................................................. G11B 5/56
[52] U.S. Cl. .................................. 360/75; 360/66; 360/77.07; 360/77.12
[58] Field of Search ............. 360/66, 75, 77.07, 77.12, 360/77.13, 78.02, 77.01, 77.15

[56] References Cited

U.S. PATENT DOCUMENTS

| | | | |
|---|---|---|---|
| 4,422,111 | 12/1983 | Moeller et al. | 360/72.1 |
| 4,527,202 | 7/1985 | Ohta | 360/66 |
| 4,586,094 | 4/1986 | Chambors et al. | 360/77.12 |
| 4,977,468 | 12/1990 | Aruga et al. | 360/77.12 |
| 5,111,347 | 5/1992 | Ono et al. | 360/77.12 |

*Primary Examiner*—Timothy P. Callahan
*Attorney, Agent, or Firm*—Woodcock Washburn Kurtz Mackiewicz & Norris

[57] ABSTRACT

A method of, and an apparatus for, positioning a playback head in a transverse reference position on one edge of a multitrack magnetic tape having no track identification data or other positioning patterns prerecorded thereon. A tape drive unit is provided which has an erase head with an erase gap spanning the complete width of the tape. An alternating current generator circuit is connected to the erase head for supplying thereto a constant frequency alternating current to be written as a transverse head positioning pattern by the erase head on selected part of the tape throughout its width. The positioning pattern is then read by the playback head traveling across the width of the tape from an arbitrary position on the tape, in which the playback head is fully opposed to the positioning pattern, toward one edge of the tape while the tape is being driven longitudinally. The alternating current output from the playback head is of full amplitude when the playback head is fully opposed to the positioning pattern, and gradually decreases in amplitude when the playback head starts overrunning the tape edge. The travel of the playback head across the width of the tape is discontinued when the peak value of the playback head output decreases to a predetermined percentage of that when the playback head is fully opposed to the positioning pattern.

7 Claims, 4 Drawing Sheets

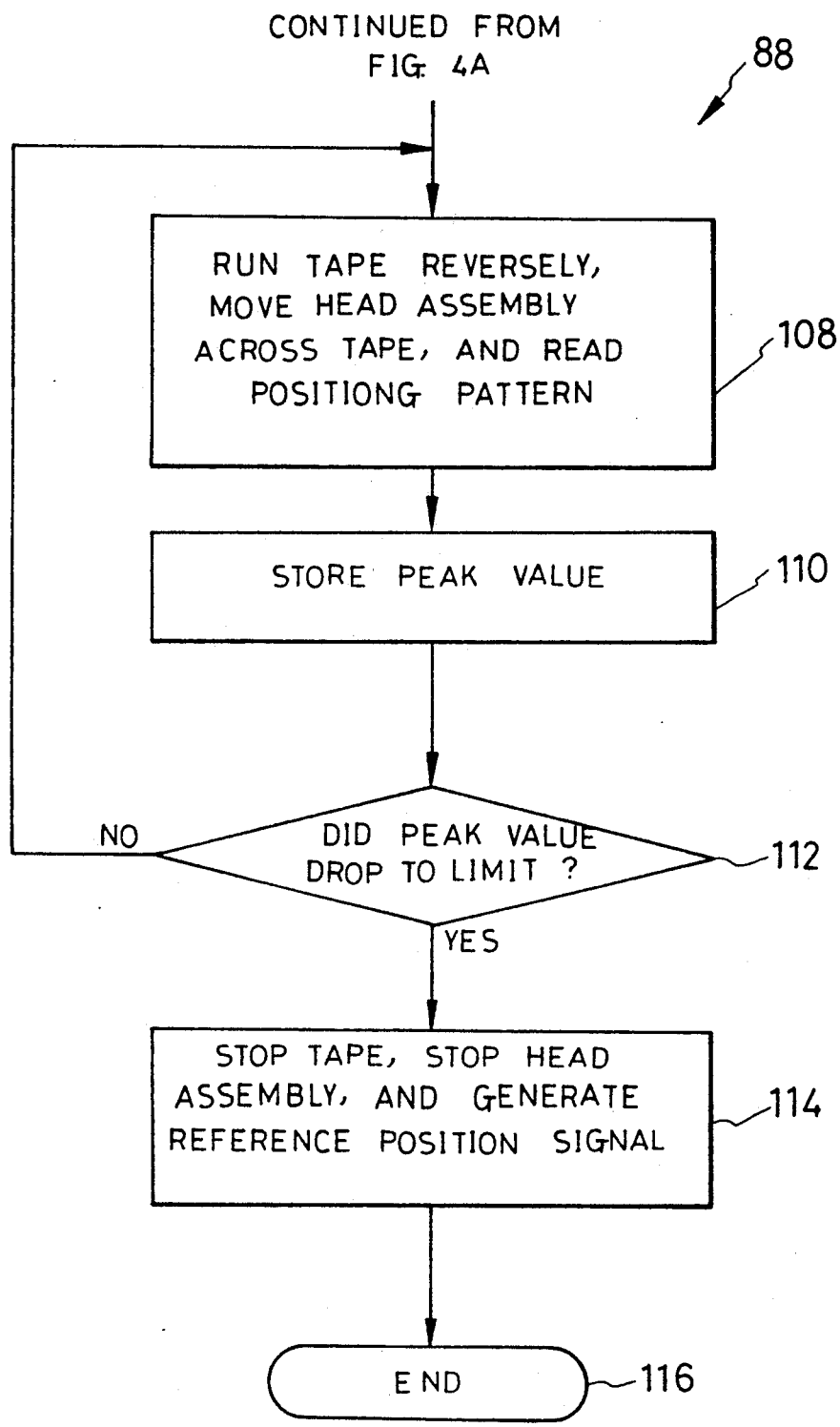

SYSTEM FOR POSITIONING A HEAD IN A TRANSVERSE REFERENCE POSITION ON A MULTITRACK DIGITAL MAGNETIC TAPE

BACKGROUND OF THE INVENTION

Our invention relates generally to the art of data recording on tape media, and particularly to apparatus for the recording and reproduction of digital data on multitrack magnetic tapes packaged in cassette form or otherwise preloaded in similar reel to reel envelopes. More particularly, our invention pertains to a method and means in such apparatus for positioning a data transducer or head in a transverse reference position on one edge of the tape in order to enable control over the subsequent transverse head location with respect to a plurality or multiplicity parallel record tracks on the tape.

Multitrack magnetic tapes have found widespread acceptance as compact and inexpensive data storage media. Such a tape permits digital data to be recorded thereon along a plurality or multiplicity of tracks extending side by side in the longitudinal direction of the tape. Normally, each track is recorded in a direction opposite to that in which the preceding track has been formed. The result is what is known as a serpentine track pattern.

The record tracks of such a serpentine multitrack tape may be individually identified by coded data prerecorded on each such track. Alternatively, in the absence of such track identification data, the head may be positioned transversely of the tape by first precisely locating the head with respect to one edge of the tape to provide a reference head position. The head may then be accessed from this reference position to a desired track location.

U.S. Pat. No. 4,422,111 to Moeller et al. describes and claims the second mentioned type of head positioning system. It teaches the use of a magnetic tape having prerecorded thereon a plurality of longitudinally readable key patterns of equal length each extending across the entire width of the tape. The key patterns are separated from one another by recordable tape sections of greater equal length, with each pattern uniquely identifying an adjacent record section. These key patterns are also utilized during initial loading operations to determine the precise edge of the tape and thereby provide a reference head position from which all subsequent track locations may be indexed.

Thus, as far as we are aware, the positioning of the head in the transverse direction of a multitrack magnetic tape has conventionally been accomplished by prerecording track identification data or key patterns on the tape. We object to such prerecording of identification data or patterns on magnetic tapes because they require special recording equipment, which has added substantially to the manufacturing costs of the tapes. As an additional disadvantage, such prerecorded tapes impose restrictions on their latitude of use.

SUMMARY OF THE INVENTION

We have hereby invented how to position a data transducer in a transverse reference position on a multitrack data storage tape having no track indentification data or other magnetic patterns prerecorded thereon.

Briefly, our invention is directed to a tape drive unit of the type having a playback head and an erase head for data transfer with a multitrack data storage tape. The playback head has a gap width less than the width of the tape and is positionable transversely of the tape extending along a transport path in the drive unit. The erase head has a gap spanning the complete width of the tape regardless of the transverse position of the playback head with respect to the tape.

More specifically, our invention concerns, in the tape drive unit of the above outlined type, a method of, and a system for, positioning the playback head in a transverse reference position on one edge of the multitrack data storage tape in order to enable control over the subsequent positioning of the playback head with respect to a plurality or multiplicity of record tracks on the tape.

First, according to the method of our invention, a transverse head positioning pattern is recorded by the erase head on selected part of the tape. Since the erase head has a gap spanning the complete width of the tape, the transverse head positioning pattern is recorded throughout the width of the selected part of the tape. Then the positioning pattern is read by the playback head traveling across the width of the tape from an arbitrary position on the tape, in which the playback head is fully opposed to the positioning pattern, toward one edge of the tape. Reading positioning pattern, the playback head produces an output which is of full magnitude when the playback head is fully opposed to the tape and which decreases in magnitude when the playback head starts overrunning the edge of the tape. Such output from the playback head is constantly monitored during its travel across the width of the tape, and the travel of the playback head is stopped when the output therefrom drops in magnitude to a predetermined level. Thus the playback head can be positioned in a transverse reference position on the tape edge.

Preferably, for the creation of the transverse head positioning pattern on the tape, an alternating current with a constant frequency is supplied to the erase head. The alternating current pattern is then read by the playback head traveling across the width of the tape which is itself traveling longitudinally. So reading the pattern, the playback head will produce an approximately sinusoidal output which is of full amplitude when the playback head is fully opposed to the tape, and which gradually decreases in amplitude as the playback head starts overrunning the edge of the tape. Therefore, the peak value, for example, of the output from the playback head when it is fully opposed to the tape may be stored. Then, by monitoring the peak values of the successive cycles of the output from the playback head traveling toward the tape edge, the travel of the playback head may be arrested when the peak value decreases to a predetermined percentage of the stored peak value.

We have thus succeeded in eliminating the need for use of a prerecorded tape for positioning the playback head on one tape edge. It will be appreciated that we have utilized the erase head, which has so far been used solely for erasing data on the tape, for recording the transverse head positioning pattern. This positioning pattern can be easily written all over the width of the tape as the erase head has a gap spanning the entire tape width.

Our invention also provides a system for transversely positioning the playback head on one edge of the tape. The system includes a generator circuit, such as a source of a constant frequency alternating current, connected via an on off switch to the erase head for supplying thereto a transverse head positioning signal to be written on selected part of the tape. Also, in a preferred embodiment of our invention, a peak hold circuit is connected to the playback head for holding the peak values of successive cycles of the output from the playback head reading the alternating current pattern on the tape. After being digitized, the peak values are sent to a microprocessor controller which may be factory preprogrammed for implementing the method of our invention.

The noted steps constituting the method of our invention can be controlled by the microprocessor controller in accordance with software instructions that have been introduced into it. Also, the controller has means for storing the peak value of the output from the playback head when the latter is fully opposed to the transverse head positioning pattern on the tape. Monitoring the subsequent peak values of the output from the playback head traveling toward the edge of the tape, the controller causes head positioning means of any known or suitable make to stop the travel of the playback head when the peak value of the output therefrom decreases to a predetermined percentage of the stored peak value.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIGS. 4A and 4B show in combination a flowchart representative of the operation of the preprogrammed microprocessor controller of the FIG. 1 system.

DESCRIPTION OF THE PREFERRED EMBODIMENT

Figure 1:
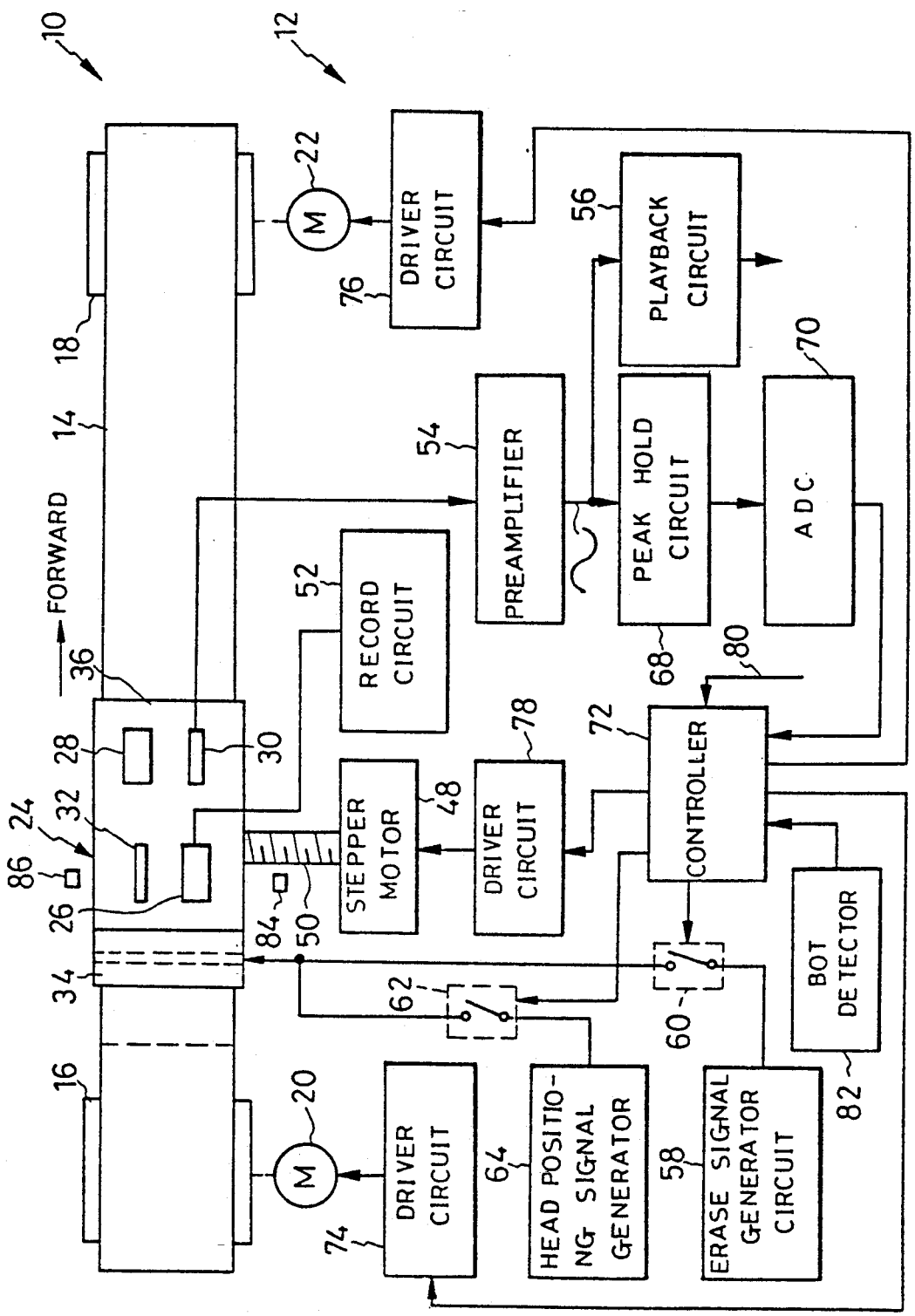
FIG. 1 is a combined elevational and block diagrammatic illustration of a magnetic multitrack tape drive system embodying the principles of our invention.

We will now describe our invention in detail as embodied in the digital multitrack magnetic tape cassette apparatus shown in FIG. 1. Broadly, the illustrated apparatus is a combination of a replaceable tape cassette 10 and a drive unit 12 therefor. The tape cassette 10 includes a length of magnetic tape 14 having its opposite ends anchored to a pair of reel hubs or spools 16 and 18 rotatably mounted within a housing which is not shown.

The drive unit 12 has a pair of electric tape transport motors 20 and 22 for direct driving engagement with the hubs 16 and 18 of the tape cassette 10 as the latter is mounted in position in the drive unit. The tape 14 is to be run bidirectionally by the motors 20 and 22 along a predetermined transport path. We assume that in the illustrated embodiment, the tape 14 travels forwardly from hub 16 to hub 18, as indicated by the arrow in FIG. 1.

Also included in the drive unit 12 is a magnetic head assembly 24 disposed along the transport path of the magnetic tape 14. The head assembly 24 comprises two record heads 26 and 28, two playback heads 30 and 32, and an erase head 34, all mounted to a movable head mount or carrier 36. The record head 26 is for recording of digital data on the tape 14 traveling forwardly, and the other record head 28 for data recording on the tape traveling reversely. The playback head 30 is for reproduction of digital data from the tape traveling forwardly, and the other playback head 32 for data reproduction from the tape traveling reversely.

Despite the showing of FIG. 1, however, it is not essential that the erase head 34 be mounted to the movable head mount 36, it being unnecessary for the erase head to travel transversely of the tape 14. Therefore, alternatively, the erase head 34 may be separated from the head assembly 24 and fixed along the tape transport path by being mounted to some stationary part of the drive unit 12.

Figure 2:
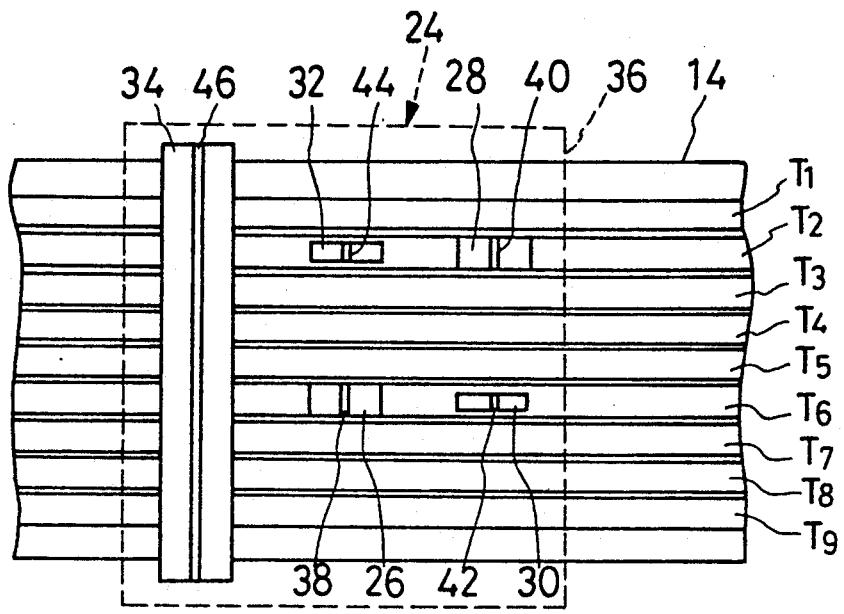
FIG. 2 is an enlarged, fragmentary illustration of the magnetic tape, showing the arrangement of the parallel record tracks thereon, together with the magnetic head assembly for data transfer therewith.

Before proceeding further with the discussion of the head assembly 24, we will refer briefly to FIG. 2 for a study of record tracks on the magnetic tape 14. The tape is therein shown to have nine record tracks $T_1$-$T_9$ extending side by side in the length direction of the tape. Despite the showing of FIG. 2, however, our invention will be of particular utility with magnetic tapes having a much greater number of tracks, say, twenty or even more.

As indicated also in FIG. 2, the record heads 26 and 28 have gaps 38 and 40 each with a width approximately equal to the width of each of the record tracks $T_1$-$T_9$. (By the term "width" of the gap, as used herein and in the claims appended hereto, we mean the gap dimension transverse to the tape 14 or to each record track thereon, even though the gap generally extends across the tape.) The playback heads 30 and 32 have gaps 42 and 44 each with a width less than the gap width of each of the record heads 26 and 28 and, therefore, than each track width. The erase head 34 has a gap 46 with a width in excess of the complete width of the tape 14, extending beyond both edges of the tape.

Speaking more exactly, the gap width of the erase head 34 may differ depending upon whether the erase head is fixed or movable across the width of the tape 14. If it is fixed, the erase gap width should be not less than the width of the tape 14 plus the manufacturing tolerance of the tape width plus the allowed transverse displacement of the tape with respect to the head assembly 24. On the other hand, if the erase head 34 is mounted to the head mount 36 for movement across the width of the tape 14, then the erase gap width may be made approximately twice the tape width so that the erase gap may infallibly span the complete tape width regardless of the position of the erase head in the width direction of the tape. Of course, if the erase gap is so wide, it does not matter whether the erase head is fixed or movable. We understand that the record heads 26 and 28, playback heads 30 and 32 and erase head 34 are conventional in the other details of construction, comprising magnetic cores and windings which are both not shown because of their well known nature.

With reference back to FIG. 1 the complete head assembly 24 is adapted for transverse movement across the width of the tape 14 in order to position the record heads 26 and 28 and the playback heads 30 and 32 on any of the record tracks $T_1$-$T_9$ on the tape. We have employed to this end an electric bidirectional stepper motor 48 coupled to the head assembly 24 via a lead screw 50. Thus, with the incremental, bidirectional rotation of the stepper motor 48, the head assembly 24 travels back and forth in minute steps across the width of the tape 14.

FIG. 1 shows that only the record head 26 is connected to a record circuit 52, and only the playback head 30 connected to a preamplifier 54, for the simplicity of illustration. In practice, as is well known in the art, both record heads 26 and 28 are connected to the record circuit 52 via a selector switch, and both playback heads 30 and 32 to the preamplifier 54 via another selector switch. The record circuit 52 supplies digital data to be written on the tape 14 to the record heads 26 and 28. The preamplifier 54 amplifies the data read from the tape 14 by the playback heads 30 and 32, preparatory to further processing by a playback circuit 56.

The erase head 34 is connected both to an erase current generator circuit 58 via an on off switch 60 and, via another on off switch 62, to a transverse head positioning signal generator circuit 64 forming one of the constructional features of our invention. The erase current generator circuit 58 conventionally supplies an erase current to the erase head 34 for erasing the data that has been written on the tape 14. The transverse head positioning signal generator circuit 64 generates a transverse head positioning signal for causing the erase head 34 to create on the tape 14 a magnetic head positioning pattern 66 depicted by the hatching in FIG. 3, for use in transversely positioning the magnetic head assembly 24 on one edge of the tape according to the novel concepts of our invention. Thus, according to our invention, the erase head 34 functions not only for erasing data on the tape 14 but also for writing the transverse head positioning pattern 66 thereon. The transverse head positioning signal can be an alternating current pattern having a constant frequency. We will presently say more on this subject.

Besides being connected to the playback circuit 56 as aforesaid, the preamplifier 54 is connected to a peak hold circuit 68, also according to a feature of our invention. The peak hold circuit 68 is intended to hold the peak value of the preamplifier output representative of the transverse head positioning pattern 66 on the tape 14.

The peak hold circuit 68 is connected via an analog to digital converter (ADC) 70 to a controller 72 in the form of a factory preprogrammed digital microprocessor. Thus, translated into a digital equivalent by the ADC 70, the peak value of the reproduced transverse head positioning pattern 66 is fed into the microprocessor controller 72.

The microprocessor controller 72 has outputs connected to the on off switches 60 and 62 for their on off control. Additionally, the controller 72 has outputs connected to reel motor driver circuits 74 and 76 and a stepper motor driver circuit 78 for controlling the tape transport motors 20 and 22 and the transverse head positioning motor 48. Also, the controller 72 has an input for receiving a tape edge detect command from an external source, not shown, over a line 80, and another input connected to a beginning of tape (BOT) detector 82. A standard part of magnetic tape apparatus of this type, the BOT detector 82 provides a binary output indicative of whether the head assembly 24 is positioned at the beginning of the tape 14 or not. We understand that the microprocessor controller 72 has an internal memory for storing the output from the ADC 70 and is preprogrammed to position the head assembly 24 transversely of the tape 14 according to our invention.

We have shown at 84 and 86 in FIG. 1 a pair of limit stops, per se conventional in the art, for limiting the linear movement of the head mount 36, and hence of the head assembly 24, across the width of the magnetic tape 14. Immovably mounted to a stationary part, not shown, of the drive unit, the limit stops 84 and 86 serve to determine approximate transverse limit positions of the head assembly 24. Because of the unavoidable dimensional errors that arise in the manufacture and assemblage of the various related parts of both tape cassette 10 and drive unit 12, and because of the variability of the transverse position of the magnetic tape 14 relative to the head assembly 24, the limit stops 84 and 86 cannot possibly provide any precise reference positions for the head assembly in the width direction of the magnetic tape.

Operation

Let us assume that the tape cassette 10 has been loaded in position in the drive unit 12, with the magnetic tape 14 extending along the predefined transport path, and with the tape transport motors 20 and 22 in driving engagement with the cassette hubs 16 and 18, as shown in FIG. 1. Also, unlike the showing of FIG. 1, we assume that the head assembly 24 is initialized in a position against the lower limit stop 84 when the drive unit 12 is powered on, as has been known heretofore. The head assembly 24 must be moved from this initial position to a preassigned reference position with respect to one edge of the magnetic tape 14 preparatory to being positioned on any of the record tracks $T_1$-$T_9$ of the tape for data transfer therewith. This movement of the head assembly 24 to the reference position takes place automatically according to the "Tape Edge Detect" routine of the control program which has been introduced into the digital microprocessor controller 72.

Figure 4A:
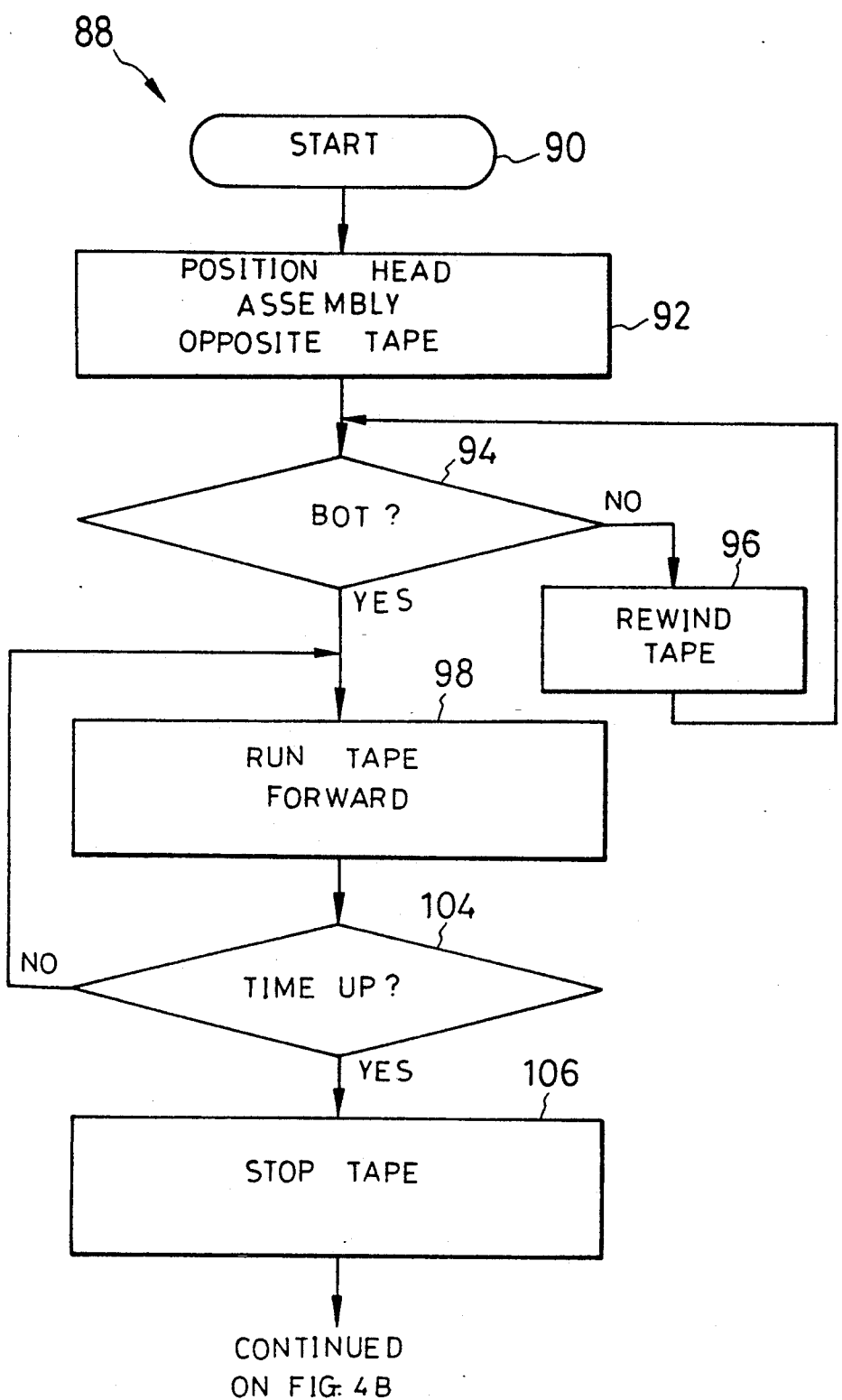

We have flowcharted in FIG. 4 the "Tape Edge Detect" routine 88 of the control program according to our invention. The flowchart is shown divided into two separate sheets of drawing designated FIGS. 4A and 4B.

Following the commencement of the "Tape Edge Detect" routine 88 at a block 90 in FIG. 4A, the head assembly 24 is moved transversely of the magnetic tape 14 to a position opposite the tape at the next block 92. The controller 72 commands the stepper motor driver circuit 78 to that effect, causing the same to step the stepper motor 48 as a number of times required for positioning the head assembly 24 opposite the tape 14. Since the head assembly 24 has been initialized in the position against the bottom limit stop 84, there can be known previously the number of steps required for moving the head assembly from this initial to the position opposite the tape 14.

At this time, too, any precise positioning of the head assembly 24 with respect to the tape 14 cannot possibly be expected because of the dimensional and manufacturing errors of the transverse head positioning mechanism and the tape cassette 10. However, since the erase head 34 has a gap width much greater than the tape width, the head assembly 24 can be stepped to an approximate position opposite the tape 14, in which the erase head invariably spans the complete width of the tape, with the playback heads 30 and 32 wholly disposed inside the opposite edges of the tape.

Then, at a logical node 94 entitled "BOT", the controller 72 determines on the basis of the output from the BOT detector 82 whether the head assembly 24 is positioned at the beginning of the tape 14 or not. If not, the controller 72 commands at a block 96 the tape transport motor driver circuits 74 and 76 to run the tape 14 until the BOT detector 82 conventionally detects the beginning of the tape.

The answer yes to the "BOT" node 94 directs the routine 88 to a block 98 where the controller 72 again commands the tape transport motor drive circuits 74 and 76 to run the tape 14 forwardly, that is, in the arrow marked direction in FIG. 1. At the same time the controller 72 closes the switch 62 for the delivery of the transverse head positioning signal, which is in the form of a constant frequency alternating current, from generator circuit 64 to erase head 34.

Figure 3:
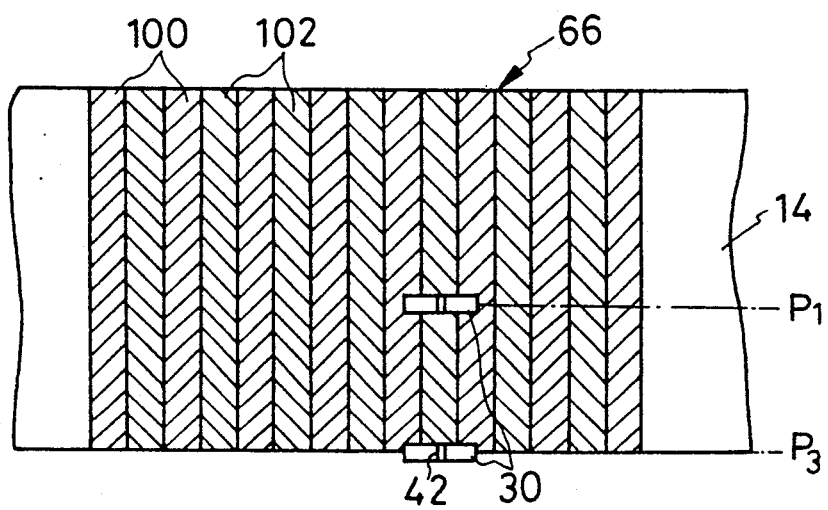
FIG. 3 is a similar illustration of the magnetic tape, showing the transverse head positioning pattern recorded thereon, together with the playback head reading the pattern in order to be positioned on the tape edge.

Thus, as drawn by the hatching in FIG. 3, the erase head 34 will create the transverse head positioning pattern 66 on the tape 14 in the adjacency of its beginning. We have shown the head positioning pattern 66 as an alternation of positive going magnetic regions 100 and negative going magnetic regions 102. Having the gap 46, FIG. 2, spanning the whole width of the tape 14, the erase head 34 will create the magnetic pattern 66 all across the tape longitudinally along the tape.

Then, upon lapse of a preassigned time at a "Time UP" node 104 following the start of the forward tape travel at the block 98, the controller 72 discontinues the forward tape travel and opens the switch 62 at a block 106. Now has been completed the recording of the transverse head positioning pattern 66 on the tape 14. We will later explain with reference to FIG. 5 how long is the "preassigned time" which has been mentioned in connection with the "Time UP" node 104, that is, how long is the head positioning pattern 66 in the longitudinal direction of the tape 14.

FIG. 4B sets forth the rest of the "Tape Edge Detect" routine 88 now in progress. At a block 108, which immediately follows the FIG. 4A block 106, the controller 72 commands the tape transport motor driver circuits 74 and 76 to rewind the tape 14 toward its beginning. Also, at the same block 108, the controller 72 commands the stepper motor driver circuit 78 to cause the head assembly 24 to travel toward the bottom edge, as seen in FIGS. 1–3, of the tape 14. While thus traveling down the width of the tape 14, which is itself traveling reversely, the playback head 30 will read the transverse head positioning pattern 66 thereon and produce a corresponding, approximately sinusoidal wave representative of the successive transverse magnetized regions 100 and 102. This output from the playback head 30 will be sent to the peak hold circuit 68 via the preamplifier 54.

The peak hold circuit 68 will detect and hold the peak value of the amplified sinusoidal output from the playback head 30 during each cycle thereof encompassing one transverse magnetized region 100 and one neighboring transverse magnetized region 102. The detected peak value will then be translated into a digital equivalent by the ADC 70, which in turn will be sent to the controller 72.

Suppose that the playback head 30 was in the position $P_1$ in FIG. 3 on the tape 14 with respect to its transverse direction at the start of its downward travel across the width of the tape at the block 108. The gap of the playback head 30 was then wholly opposed to the magnetic pattern 66. Therefore, as graphically represented in FIG. 5, the output from the playback head 30 was then of full (100 percent) amplitude. The playback head 30 will continue the production of such full amplitude output as it travels down the width of the tape from position $P_1$ to position $P_2$, during which the gap of the playback head remains wholly opposed to the magnetic pattern 66. The peak hold circuit 68 will hold the peaks of the successive cycles of the full amplitude output from the playback head 30 and deliver them to the ADC 70. As indicated at a block 110, the controller 72 writes on its microprocessor memory one, normally the first, of the series of digitized peak values supplied from the ADC 70 during the travel of the playback head 30 from position $P_1$ to position $P_2$. The position $P_2$, which is not shown in FIG. 3, would be very close to and partially overlapping the position $P_3$.

Alternatively, for more accurate determination of the transverse position of the playback head 30 with respect to the tape 14, the series of the digitized peak values supplied from the ADC 70 during the travel of the playback head from position $P_1$ to position $P_2$ on the tape may be averaged, and this average may be stored on the memory of the controller 72. It is also to be noted in connection with the block 108 of the "Tape Edge Detect" routine 88 that the playback head 30 need not start reading the magnetic pattern 66 concurrently with, or after, the commencement of the travel of the head assembly 24 down the width of the tape 14. Accordingly, before the head assembly 24 starts traveling down the width of the tape 14, the output from the playback head 30 may be digitized and stored on the microprocessor memory.

Figure 5:
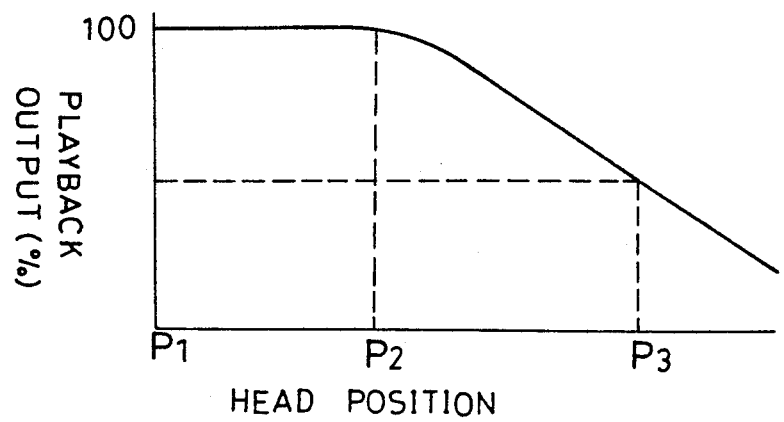
FIG. 5 is a graph explanatory of how the playback head is positioned on one edge of the tape in the FIG. 1 system.

As the playback head 30 travels past the position $P_2$ on the tape 14, its gap will start overrunning the bottom edge of the tape, that is, beyond the boundary of the magnetic pattern 66 thereon. Then, as indicated in the graph of FIG. 5, the output amplitude of the playback head 30 will start decreasing.

Then, at a logical node 112, the controller 72 determines whether the peak value of the output from the playback head 30 has decreased to a predetermined percentage of the value (full amplitude value) that has been previously stored on the microprocessor memory. We have set this predetermined percentage at fifty. The position $P_3$ in FIGS. 3 and 5 represents that transverse position of the playback head 30 with respect to the tape 14 where the peak value of its output amplitude decreases to fifty percent of the previously stored full amplitude value.

We mentioned in conjunction with the "Time UP" node 104 the "preassigned time" during which the transverse head positioning pattern 66 was recorded on the tape 14. This preassigned time determines how long the magnetic pattern 66 is recorded on the tape in its longitudinal direction. As will now be apparent, the dimension of the magnetic pattern 66 in the longitudinal direction of the tape must be sufficient for the playback head 30 to travel from position $P_1$ to position $P_3$ thereon without overrunning the longitudinal boundaries of the magnetic pattern in the face of simultaneous tape travel in the reverse direction.

The controller operations set forth in the next block 114 occur when the playback head 30 arrives at the position $P_3$. At this block the controller causes the tape transport motor driver circuits 74 and 76 to discontinue the reverse tape travel, causes the stepper motor driver circuit 78 to discontinue the transverse travel of the head assembly 24, and internally generates a signal indicative of the fact that the head assembly has been moved to the reference position in the transverse direction of the tape 14. The reference position of the head assembly 24 is such that the gap 42 of the playback head 30 half projects beyond the bottom edge of the tape 14. The "Tape Edge Detect" routine 88 comes to an end at 116.

The subsequent track seeking operation of the head assembly 24 can be conventional. Having been moved as above to the transverse reference position on the tape 14, the head assembly 24 may be stepped a required number of times for moving the record head 26 or playback head 30 into alignment with any of the record tracks $T_1$–$T_9$ on the tape 14. The microprocessor controller 72 has a counter built into it for registering data representative of the difference between the reference position and the current position of the head assembly 24 on the tape 14. Thus the microprocessor always knows the current head position.

We have assumed in the foregoing description of operation that the tape cassette 10 is being put to use for the first time with the drive unit 12. Since the transverse head positioning pattern 66 has been recorded on the virgin tape 14 for the initial placement of the head assembly 24 on its transverse reference position, no rerecording of the positioning pattern is necessary for transversely positioning the head assembly on the same tape for the second and any subsequent times.

Possible Modifications

Although we have shown and described our invention in terms of but one preferred embodiment thereof and as applied to tape cassette apparatus, we recognize, of course, that our invention could be embodied in many other widely different forms and applications. The following, then, is a brief list of possible modifications, alterations and adaptations of the illustrated embodiment which will readily suggest themselves to those skilled in the tape drive and allied arts without departing from the scope of our invention.

1. The recording of the transverse head positioning pattern on the tape by the erase head, and the reading of this pattern by the playback head, could be concurrent.

2. The transverse position of the head assembly on the tape could be determined not on the basis of the peaks of the semisinusoidal output from the playback head but on that of its average value during each cycle.

3. Instead of digitizing the output from the peak hold circuit, this output could be compared directly with a reference voltage by providing an analog comparator in combination with a source of the reference voltage.

4. Some part or parts of the recording circuit could be utilized for recording the transverse head positioning pattern on the tape.

5. The transverse head positioning pattern could be read by the reverse playback head, instead of by the playback head as in the illustrated embodiment.

6. The transverse head positioning pattern could be read while the tape was running forwardly, instead of reversely as in the illustrated embodiment.

7. The fact that the head assembly has arrived at the transverse reference position on the tape could be determined when the difference between the peak or average values of the full and the reduced amplitude outputs from the playback head exceeded a predetermined limit.

8. Our invention may be applied to drive units of the kind having but one tape transport motor for use with a magnetic tape cartridge type DC 2000 manufactured by Minnesota Mining & Co.

What we claim is:

1. In a drive unit having a playback head and an erase head for data transfer with a multitrack data storage tape, the playback head having a gap width less than the width of the tape and being positionable transversely of the tape extending along a transport path in the drive unit, the erase head having a gap spanning the complete width of the tape regardless of the transverse position of the playback head with respect to the tape, a method of positioning the playback head in a transverse reference position on one edge of the multitrack data storage tape in order to enable control over the subsequent positioning of the playback head with respect to a plurality or multiplicity of record tracks on the tape, which method comprises:

(a) recording a transverse head positioning pattern on selected part of the tape by the erase head, the transverse head positioning pattern being recorded throughout the entire width of the tape;

(b) moving the playback head across the width of the tape from an arbitrary position on the tape, in which the playback head is fully opposed to the transverse head positioning pattern on the tape, toward one edge of the tape;

(c) concurrently with step (b), reading the transverse head positioning pattern on the tape by the playback head, with the playback head producing an output which is of full magnitude when the playback head is fully opposed to the transverse head positioning pattern on the tape and which gradually decreases in magnitude when the playback head starts overrunning the edge of the tape;

(d) monitoring the output from the playback head during the travel of the playback head transversely of the tape; and (e) stopping the travel of the playback head across the width of the tape when the output from the playback head drops in magnitude to a predetermined level.

2. In a drive unit having a playback head and an erase head for data transfer with a multitrack data storage tape, the playback head having a gap width less than the width of the tape and being positionable transversely of the tape extending along a transport path in the drive unit, the erase head having a gap spanning the complete width of the tape regardless of the transverse position of the playback head with respect to the tape, a method of positioning the playback head in a transverse reference position on one edge of the multitrack data storage tape in order to enable control over the subsequent positioning of the playback head with respect to a plurality or multiplicity of record tracks on the tape, which method comprises:

(a) recording an alternating current pattern longitudinally on selected part of the tape by the erase head, the alternating current pattern being recorded throughout the entire width of the tape;

(b) moving the playback head across the width of the tape from an arbitrary position on the tape, in which the playback head is fully opposed to the transverse head positioning pattern on the tape, toward one edge of the tape while the tape is traveling longitudinally;

(c) concurrently with step (b), reading the alternating current pattern on the tape by the playback head, with the playback head producing an output which is of full amplitude when the playback head is fully opposed to the alternating current pattern on the tape and which gradually decreases in amplitude when the playback head starts overrunning the edge of the tape;

(d) monitoring the output from the playback head during the travel of the playback head transversely of the tape; and (e) stopping the travel of the playback head across the width of the tape when the output from the playback head drops in amplitude to a predetermined percentage of that when the playback head is fully opposed to the alternating current pattern on the tape.

3. In a drive unit having a playback head and an erase head for data transfer with a multitrack data storage tape, the playback head having a gap width less than the width of the tape and being positionable transversely of the tape extending along a transport path in the drive unit, the erase head having a gap spanning the complete width of the tape regardless of the transverse position of the playback head with respect to the tape, a method of positioning the playback head in a transverse reference position on one edge of the multitrack data storage tape in order to enable control over the subsequent positioning of the playback head with respect to a plurality or multiplicity of record tracks on the tape, which method comprises:

(a) recording an alternating current pattern longitudinally on selected part of the tape by the erase head, the alternating current pattern being recorded throughout the entire width of the tape;

(b) moving the playback head across the width of the tape from an arbitrary position on the tape, in which the playback head is fully opposed to the transverse head positioning pattern on the tape, toward one edge of the tape while the tape is traveling longitudinally;

(c) substantially concurrently with step (b), reading the alternating current pattern on the tape by the playback head, with the playback head producing an output which is of full amplitude when the playback head is fully opposed to the alternating current pattern on the tape and which gradually decreases in amplitude when the playback head starts overrunning the edge of the tape;

(d) storing the peak value of the output from the playback head when the playback head is fully opposed to the alternating current pattern on the tape;

(e) monitoring the peak values of successive cycles of the output from the playback head as the playback head travels toward the edge of the tape; and (f) stopping the travel of the playback head across the width of the tape when the peak value of the output from the playback head decreases to a predetermined percentage of the peak value stored at step (d).

4. In a drive unit having a playback head and an erase head for data transfer with a multitrack data storage tape, the playback head having a gap width less than the width of the tape and being positionable transversely of the tape extending along a transport path in the drive unit, the erase head having a gap spanning the complete width of the tape regardless of the transverse position of the playback head with respect to the tape, a system for positioning the playback head in a transverse reference position on one edge of the multitrack data storage tape in order to enable control over the subsequent positioning of the playback head with respect to a plurality or multiplicity of record tracks on the tape, which system comprises:

(a) tape transport means for driving the tape back and forth along the transport path;

(b) a generator circuit connected to the erase head for generating a transverse head positioning signal to be recorded by the erase head as a transverse head positioning pattern on selected part of the tape, the transverse head positioning pattern being recorded throughout the entire width of the tape;

(c) head positioning means for moving at least the playback head across the width of the tape, the playback head reading the transverse head positioning pattern on the tape while being moved across the width of the tape from an arbitrary position on the tape, in which the playback head is fully opposed to the transverse head positioning pattern on the tape, toward one edge of the tape, the playback head on reading the transverse head positioning pattern producing an output which is of full magnitude when the playback head is fully opposed to the transverse head positioning pattern on the tape and which gradually decreases in magnitude when the playback head starts overrunning the edge of the tape; and (d) controller means for monitoring the output from the playback head during the travel of the playback head across the width of the tape and for causing the head positioning means to stop the travel of the playback head when the output from the playback head drops in magnitude to a predetermined level.

5. In a drive unit having a playback head and an erase head for data transfer with a multitrack data storage tape, the playback head having a gap width less than the width of the tape and being positionable transversely of the tape extending along a trasport path in the drive unit, the erase head having a gap spanning the complete width of the tape regardless of the transverse position of the playback head with respect to the tape, a system for positioning the playback head in a transverse reference position on one edge of the multitrack data storage tape in order to enable control over the subsequent positioning of the playback head with respect to a plurality or multiplicity of record tracks on the tape, which system comprises:

(a) tape transport means for driving the tape back and forth along the transport path;

(b) a generator circuit connected to the erase head for generating an alternating current having a constant frequency to be recorded by the erase head as a transverse head positioning pattern on selected part of the tape, the transverse head positioning pattern being recorded throughout the entire width of the tape;

(c) head positioning means for moving at least the playback head across the width of the tape, the playback head reading the transverse head positioning pattern on the tape while the tape is being driven longitudinally by the tape transport means and while the playback head being moved by the head positioning means across the width of the tape from an arbitrary position on the tape, in which the playback head is fully opposed to the transverse head positioning pattern on the tape, toward one edge of the tape, the playback head on reading the transverse head positioning pattern producing an output which is of full amplitude when the playback head is fully opposed to the transverse head positioning pattern on the tape and which gradually decreases in amplitude when the playback head starts overrunning the edge of the tape; and (d) controller means for monitoring the output from the playback head during the travel of the playback head across the width of the tape and for causing the head positioning means to stop the travel of the playback head when the output from the playback head drops in amplitude to a predetermined percentage of that when the playback head is fully opposed to the transverse head positioning pattern on the tape.

6. The system of claim 5 wherein the controller means comprises:

(a) a peak hold circuit connected to the playback head for holding the peak values of successive cycles of the output from the playback head reading the transverse head positioning pattern on the tape; and (b) a controller connected to the peak hold circuit for storing the peak value of the output from the playback head when the playback head is fully opposed to the transverse head positioning pattern on the tape, and for monitoring the subsequent peak values of the output from the playback head as the playback head travels toward the edge of the tape, the controller being also connected to the head positioning means for causing the same to stop the travel of the playback head when the peak value of the output from the playback head decreases to a predetermined percentage of the stored peak value.

7. The system of claim 5 further comprising an on off switch connected between the generator circuit and the erase head, the controller means being connected to the switch for on off control thereof.

* * * * *